US012758996B2

(12) United States Patent
Yu

(10) Patent No.: US 12,758,996 B2
(45) Date of Patent: Oct. 13, 2026

(54) SPRAY APPLICATION SYSTEM AND METHODS OF USE THEREOF

(71) Applicant: BMIC LLC, Dallas, TX (US)

(72) Inventor: Lingtao Yu, Summit, NJ (US)

(73) Assignee: BMIC LLC, Dallas, TX (US)

( * ) Notice: Subject to any disclaimer, the term of this patent is extended or adjusted under 35 U.S.C. 154(b) by 17 days.

(21) Appl. No.: 18/584,499

(22) Filed: Feb. 22, 2024

(65) Prior Publication Data

US 2024/0286156 A1 Aug. 29, 2024

Related U.S. Application Data

(60) Provisional application No. 63/447,694, filed on Feb. 23, 2023.

(51) Int. Cl.
*B05B 7/24* (2006.01)
*B05D 1/02* (2006.01)

(52) U.S. Cl.
CPC .......... *B05B 7/2443* (2013.01); *B05B 7/2478* (2013.01); *B05D 1/02* (2013.01)

(58) Field of Classification Search
CPC ........ B05B 7/2443; B05B 7/2478; B05D 1/02
USPC .................................. 427/207.1, 426, 427.1
See application file for complete search history.

(56) References Cited

U.S. PATENT DOCUMENTS 2,890,836 A 6/1959 Gusmer et al.
4,745,011 A * 5/1988 Fukuta .................... B01F 23/49 239/110
5,813,322 A 9/1998 Kuroda
6,460,787 B1 10/2002 Hartle et al.
6,827,293 B2 12/2004 Seeman
6,840,462 B2 1/2005 Hurray et al.
7,036,752 B1 * 5/2006 Hsiang .................. B05B 7/2408 239/290
7,086,549 B2 * 8/2006 Kosmyna .............. B05B 7/2478 239/328
7,350,723 B2 4/2008 Reedy
8,308,086 B2 11/2012 Micheli et al.
8,590,809 B2 * 11/2013 Escoto, Jr. ............ B05B 12/002 239/290
8,899,501 B2 12/2014 Fox et al.
9,027,858 B2 5/2015 Larson
(Continued)

FOREIGN PATENT DOCUMENTS

WO WO-2024003877 A1 * 1/2024 ........... B05B 7/2478

*Primary Examiner* — Brian K Talbot
(74) *Attorney, Agent, or Firm* — Venable LLP

(57) ABSTRACT

This invention, in embodiments, relates to a method that includes obtaining a spray application system that is configured to apply a fluid material to a surface. The spray application system includes (i) an airless spray device that is configured to receive the fluid material and to spray the fluid material onto the surface, and (ii) a receptacle that is attached to the airless spray device and is configured to supply one or more components to the fluid material. The method further includes supplying the fluid material to the airless spray device, supplying one or more components to the fluid material via the receptacle, and spraying the fluid material and the one or more components onto the surface using the airless spray device of the spray application system. The one or more components are capable of triggering curing of the fluid material. This invention further relates to a spray application system.

17 Claims, 2 Drawing Sheets

(56) References Cited

U.S. PATENT DOCUMENTS

| | | | | |
|---|---|---|---|---|
| 9,192,950 | B2 * | 11/2015 | Carleton | B05B 7/2478 |
| 9,327,301 | B2 | 5/2016 | Fox | |
| 9,808,816 | B1 | 11/2017 | Enriquez | |
| 10,189,037 | B2 | 1/2019 | Schmon et al. | |
| 10,493,474 | B2 * | 12/2019 | Rose | B05B 1/3405 |
| 10,639,658 | B1 | 5/2020 | Enriquez | |
| 10,688,511 | B2 * | 6/2020 | Hegdahl | B05B 7/2478 |
| 10,689,165 | B2 * | 6/2020 | Hegdahl | B05B 7/2478 |
| 10,717,097 | B2 | 7/2020 | Johnston et al. | |
| 10,850,290 | B2 * | 12/2020 | Joseph | B05B 7/2408 |
| 10,857,553 | B2 * | 12/2020 | Nyaribo | B65B 7/2842 |
| 11,052,412 | B2 | 7/2021 | Becker et al. | |
| 11,059,062 | B2 | 7/2021 | Adams et al. | |
| 11,229,921 | B2 * | 1/2022 | Haislet | B05B 15/65 |
| 11,413,636 | B2 * | 8/2022 | Ebertowski | B05B 7/2408 |
| 11,541,407 | B2 * | 1/2023 | Nyaribo | B05B 7/2481 |
| 11,666,934 | B2 * | 6/2023 | Hayward | B05B 15/654<br>239/302 |
| 11,707,753 | B2 * | 7/2023 | Kinne | B67C 11/02<br>141/11 |
| 11,766,686 | B2 * | 9/2023 | Haislet | B05B 7/24<br>239/390 |
| 11,980,911 | B2 | 5/2024 | Becker et al. | |
| 2003/0006322 | A1 | 1/2003 | Hartle et al. | |
| 2005/0103893 | A1 * | 5/2005 | Birrenkott | B05B 7/0408<br>239/581.1 |
| 2005/0284963 | A1 | 12/2005 | Reedy | |
| 2006/0000927 | A1 * | 1/2006 | Ruda | B05B 7/2408<br>239/345 |
| 2006/0254222 | A1 * | 11/2006 | Hammarth | C09K 3/30<br>53/470 |
| 2007/0071903 | A1 * | 3/2007 | Claar | B05D 1/34<br>427/421.1 |
| 2007/0158361 | A1 * | 7/2007 | Koyama | B05B 7/2478<br>239/323 |
| 2009/0200309 | A1 * | 8/2009 | Kosmyna | B05B 7/2478<br>220/495.02 |
| 2013/0277455 | A1 * | 10/2013 | Thompson | B05B 9/0866<br>239/289 |
| 2015/0017327 | A1 * | 1/2015 | Myers | B05B 12/002<br>239/414 |
| 2015/0231655 | A1 | 8/2015 | Adams et al. | |
| 2016/0030955 | A1 * | 2/2016 | Adams | B05B 7/1209<br>239/154 |
| 2016/0271632 | A1 * | 9/2016 | Bierie | B05B 7/2478 |
| 2017/0203887 | A1 * | 7/2017 | Hegdahl | B05B 7/2408 |
| 2019/0076857 | A1 | 3/2019 | Fideler | |
| 2019/0299232 | A1 | 10/2019 | Johnston et al. | |
| 2021/0331188 | A1 * | 10/2021 | Adams | B05B 12/002 |
| 2023/0087047 | A1 | 3/2023 | Maier | |
| 2023/0234085 | A1 | 7/2023 | Becker et al. | |

* cited by examiner

SPRAY APPLICATION SYSTEM AND METHODS OF USE THEREOF

This application claims the priority of U.S. provisional application Ser. No. 63/447,694 entitled “Spray Application System and Methods of Use Thereof” filed Feb. 23, 2023, which is incorporated herein by reference in its entirety for all purposes.

FIELD OF THE INVENTION

This invention relates to a spray application system and methods of using these systems. A spray application system is provided that allows for the addition of another component or components (e.g., an additive and/or water) when applying a fluid material, such as, e.g., a coating and/or adhesive, in a low or no moisture environment, including, e.g., a dry environment and/or a closed system.

BACKGROUND OF THE INVENTION

When a moisture-cured fluid material, such as, e.g., a coating and/or adhesive, is applied in an environment having no or low access to moisture, including, e.g., a dry environment like summertime in Arizona or a closed system, this can generally cause an extremely long curing time, which may result in the failure of the job. In this situation, adding additional moisture (e.g., an additive and/or water) to the system may be critical to significantly help and/or speed up the curing process. There is thus a need for a spray application system and method that can supply one or more components (such as, e.g., an additive and/or moisture) to the moisture-cured fluid material to assist with the curing process.

SUMMARY OF THE INVENTION

One embodiment of this invention pertains to a method comprising obtaining a spray application system that is configured to apply a fluid material to a surface, the spray application system comprising (i) an airless spray device that is configured to receive the fluid material and to spray the fluid material onto the surface, and (ii) a receptacle that is attached to the airless spray device and is configured to supply one or more components to the fluid material, supplying the fluid material to the airless spray device, supplying the one or more components to the fluid material via the receptacle, and spraying the fluid material and the one or more components onto the surface using the airless spray device of the spray application system, wherein the one or more components are capable of triggering curing of the fluid material.

In one embodiment, the supplying of the one or more components to the fluid material occurs prior to the spraying of the fluid material and the one or more components onto the surface.

In one embodiment, the supplying of the one or more components to the fluid material occurs while the fluid material is within the airless spray device.

In one embodiment, the supplying of the one or more components to the fluid material is conducted constantly as the fluid material is being supplied to the airless spray device.

In one embodiment, the supplying of the one or more components to the fluid material is conducted intermittently as the fluid material is being supplied to the airless spray device.

In one embodiment, the supplying of the one or more components to the fluid material via the receptacle is conducted through gravity or vacuum feed from the receptacle to the airless spray device.

In one embodiment, the one or more components comprise (i) water, (ii) an additive, (iii) a catalyst, (iv) a solvent, or (v) a combination of (i), (ii), (iii), and/or (iv).

In one embodiment, the fluid material comprises (i) an adhesive solution, (ii) a coating, or (iii) a combination of (i) or (ii). In an embodiment, the adhesive solution comprises a moisture-cured adhesive. In another embodiment, the coating comprises a moisture-cured coating.

In one embodiment, the one or more components decrease the time for the curing of the fluid material.

In one embodiment, the one or more components are supplied to the fluid material at a ratio of 0.1 to 10 parts component(s) to 90 to 99.9 parts fluid material.

In one embodiment, the one or more components are supplied to the fluid material at a ratio of 10 parts component(s) to 90 parts fluid material.

In one embodiment, the one or more components are supplied to the fluid material at an amount of 0.01 percent to 10 percent by weight of the fluid material.

In one embodiment, the one or more components are supplied to the fluid material at an amount of less than 0.5 percent by weight of the fluid material.

In one embodiment, the surface is a roofing surface, a wall surface, a ceiling surface, a floor surface, a below grade surface, a building surface, a container surface, a vehicle surface, or a combination thereof.

In one embodiment, the spraying of the fluid material and the one or more components onto the surface is conducted in a low moisture environment.

In one embodiment, the spraying of the fluid material and the one or more components onto the surface is conducted in a closed system with no access to moisture.

In one embodiment, the supplying of the fluid material to the airless spray device is conducted by supplying the fluid material through a tubing fed into a handle of the airless spray device.

In one embodiment, the airless spray device is coupled to a pressurized spray fluid source that supplies the fluid material to the airless spray device.

In one embodiment, the spray application system is handheld and portable.

In one embodiment, the receptacle is attached to the airless spray device (e.g., spray gun) at a region of a connection or coupling member between the receptacle and the airless spray device having a negative pressure produced by a reduced diameter and/or a high speed liquid flow which will generate a vacuum and suck the one or more components into the fluid material to thereby mix the one or more components with the fluid material when supplying the one or more components to the fluid material via the receptacle.

Another embodiment of this invention pertains to a spray application system comprising (i) an airless spray device that is configured to receive a fluid material and to spray the fluid material onto a surface, wherein the airless spray device is coupled to a pressurized spray fluid source that supplies the fluid material to the airless spray device, and (ii) a receptacle that is attached to the airless spray device and is configured to supply one or more components to the fluid material, wherein the one or more components are capable of triggering curing of the fluid material.

In one embodiment, the receptacle is configured to supply the one or more components to the fluid material through gravity or vacuum feed from the receptacle to the airless spray device.

In one embodiment, the one or more components comprise (i) water, (ii) an additive, (iii) a catalyst, (iv) a solvent, or (v) a combination of (i), (ii), (iii), and/or (iv).

In one embodiment, the fluid material comprises (i) an adhesive solution, (ii) a coating, or (iii) a combination of (i) or (ii). In an embodiment, the adhesive solution comprises a moisture-cured adhesive. In another embodiment, the coating comprises a moisture-cured coating.

In one embodiment, the one or more components decrease the time for the curing of the fluid material.

In one embodiment, the one or more components are supplied to the fluid material at a ratio of 0.1 to 10 parts component(s) to 90 to 99.9 parts fluid material.

In one embodiment, the one or more components are supplied to the fluid material at a ratio of 10 parts component (s) to 90 parts fluid material.

In one embodiment, the one or more components are supplied to the fluid material at an amount of 0.01 percent to 10 percent by weight of the fluid material.

In one embodiment, the one or more components are supplied to the fluid material at an amount of less than 0.5 percent by weight of the fluid material.

In one embodiment, the surface is a roofing surface, a wall surface, a ceiling surface, a floor surface, a below grade surface, a building surface, a container surface, a vehicle surface, or a combination thereof.

In one embodiment, the airless spray device includes a handle attached to a tubing that is configured to supply the fluid material to the airless spray device.

In one embodiment, the spray application system is handheld and portable.

In one embodiment, the receptacle is attached to the airless spray device (e.g., spray gun) at a region of a connection or coupling member between the receptacle and the airless spray device having a negative pressure produced by a reduced diameter and/or a high speed liquid flow which will generate a vacuum and suck the one or more components into the fluid material to thereby mix the one or more components with the fluid material when supplying the one or more components to the fluid material via the receptacle.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION OF THE INVENTION

Figure 1:
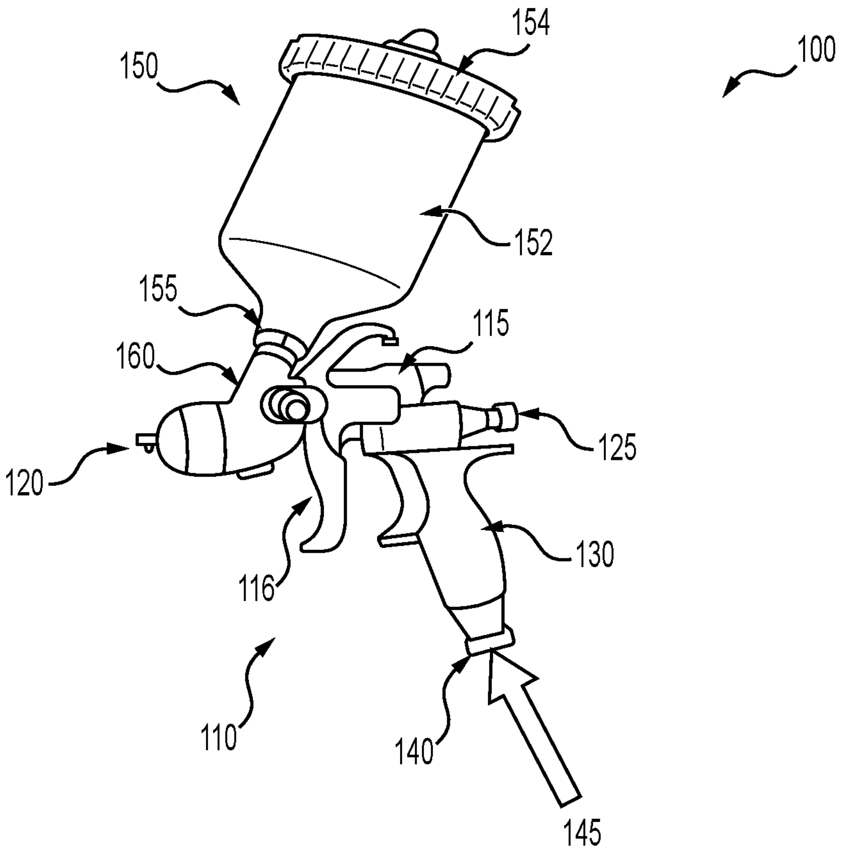
FIG. 1 is an illustration of a spray application system according to an embodiment of the invention.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "low moisture environment" means an environment having a relative humidity level of from 10% to 50%.

As used herein, the term "no moisture environment" means a closed system having no access to moisture, i.e., a relative humidity level between 0% and 10%.

As used herein, the term "humidity" or "humidity level" or "relative humidity level" refers to the presence or amount of moisture or water vapor in the air, which is measured as the actual amount of moisture or water vapor in the air as a percentage of the maximum amount of moisture or water vapor the air can hold.

As used herein, the term "weight percent" or "% by weight" means the percentage by weight of a component(s) (e.g., water, additive, catalyst, solvent, etc.) based upon a total weight of a fluid material (e.g., coating and/or adhesive).

As used herein, the term "surface" includes, but is not limited to, a roofing surface, an exterior or interior wall surface, a ceiling surface, a floor surface (including, e.g., the ground), a below grade exterior and/or interior vertical and/or horizontal surface, a building surface, a container surface, a vehicle surface, or a combination thereof. According to one embodiment, the "surface" can be any and all types of surfaces that need protective coatings, including, e.g., all kinds of buildings, containers, vehicles, etc.

As used herein, the term "roofing surface" includes, but is not limited to, shingles, roofing membranes, including, e.g., waterproofing membranes, underlayment, and tiles.

Generally, current spray guns or spray devices can either only spray a single material or can spray two similar amounts of materials. According to embodiments of this invention, a spray application system is provided that can spray one major material and one or more trace amounts of one or more materials as an additive(s) (e.g., less than 0.5% by weight).

One embodiment of this invention pertains to a method comprising obtaining a spray application system that is configured to apply a fluid material to a surface, the spray application system comprising (i) an airless spray device that is configured to receive the fluid material and to spray the fluid material onto the surface, and (ii) a receptacle that is attached to the airless spray device and is configured to supply one or more components to the fluid material, supplying the fluid material to the airless spray device, supplying the one or more components to the fluid material via the receptacle, and spraying the fluid material and the one or more components onto the surface using the airless spray device of the spray application system, wherein the one or more components are capable of triggering curing of the fluid material.

Another embodiment of this invention pertains to a spray application system comprising (i) an airless spray device that is configured to receive a fluid material and to spray the fluid material onto a surface, wherein the airless spray device is coupled to a pressurized spray fluid source that supplies the fluid material to the airless spray device, and (ii) a receptacle that is attached to the airless spray device and is configured to supply one or more components to the fluid material, wherein the one or more components are capable of triggering curing of the fluid material.

FIG. 1 illustrates a spray application system 100 according to an embodiment of the invention. In this embodiment, the spray application system 100 includes an airless spray device 110 configured to receive a fluid material (e.g., a coating and/or adhesive) and to spray the fluid material onto a surface (e.g., a roofing surface). As shown in FIG. 1, the airless spray device 110 includes a body portion 115 having (i) a trigger 116 that is configured to allow for a user to spray the fluid material out of the airless spray device 110, and (ii) a spray outlet 120 that is configured to spray the fluid material out of the airless spray device 110. The body portion 115 further includes (i) a handle 130 that is configured to allow for a user to hold the airless spray device 110, and (ii) a connector 140 that is configured to connect to a pressurized spray fluid source 145 that comprises the fluid material (e.g., a coating and/or adhesive). The airless spray device 110 can also include a spray regulator 125 that is configured to regulate the flow rate and/or pressure of the pressurized spray fluid source 145.

As further shown in FIG. 1, the spray application system 100 includes a receptable 150 that is attached to the airless spray device 110 and is configured to supply one or more components to the fluid material. According to the embodiment of FIG. 1, the receptable 150 includes a container 152 configured to hold the one or more components (e.g., an additive and/or catalyst capable of triggering curing of the fluid material) that is to be supplied to the fluid material. The container 152 includes a removable top cover 154 that can be removed to supply the one or more components to the container 152 of the receptable 150. The container 152 decreases in diameter at a bottom end thereof to a funnel shaped member 155 through which the one or more components are supplied to the fluid material contained within the body portion 115 of the airless spray device 110. The receptacle 150 is attached to the body portion 115 of the airless spray device 110 at the funnel shaped member 155 via a coupling member 160. According to one embodiment, the attachment of the receptacle 150 to the airless spray device 110 at the funnel shaped member 155, which has a reduced diameter as compared to, e.g., the container 152 of the receptable 150, generates a vacuum and enhances mixing of the one or more components with the fluid material when supplying the one or more components to the fluid material via the receptacle 150. For example, according to one embodiment, the receptacle 150 is attached to the airless spray device 110 (e.g., spray gun) at a region of the coupling member 160 between the receptacle 150 and the airless spray device 110 having a negative pressure produced by a reduced diameter and/or a high speed liquid flow which will generate a vacuum and suck the one or more components into the fluid material to thereby mix the one or more components with the fluid material when supplying the one or more components to the fluid material via the receptacle 150.

Figure 2:
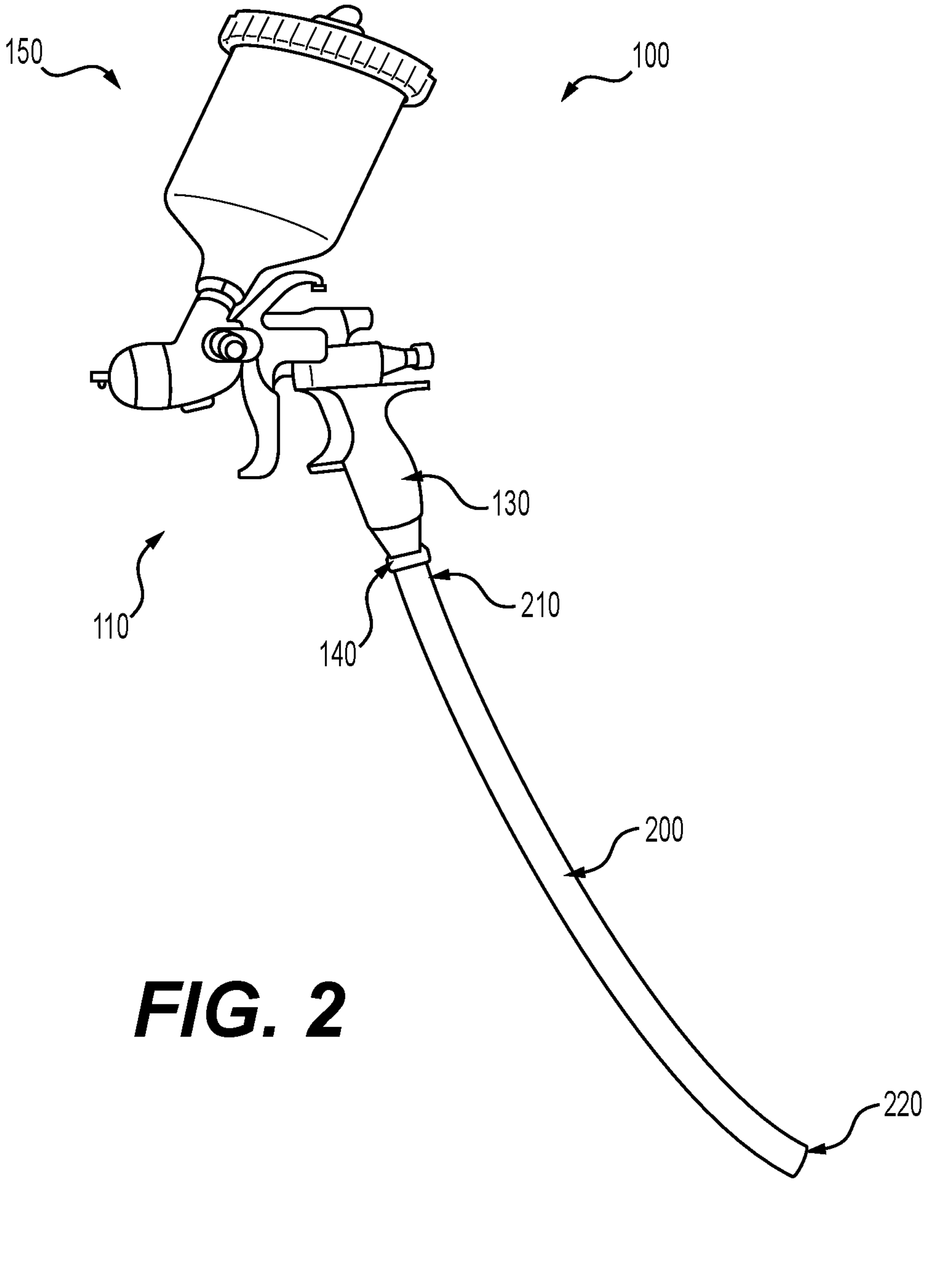
FIG. 2 is an illustration of a spray application system attached to a tubing according to an embodiment of the invention.

FIG. 2 illustrates the spray application system 100 of FIG. 1 having the airless spray device 110 and the receptacle 150. According to the embodiment of FIG. 2, a tubing 200 is attached to the handle 130 via the connector 140 at a first end 210 of the tubing 200 in order to feed or supply the fluid material via a pressurized spray fluid source (see, e.g., pressurized spray fluid source 145 of FIG. 1) through a second end 220 of the tubing 200.

According to one embodiment, a user obtains a spray application system (e.g., spray application system 100 of FIG. 1) that is configured to apply a fluid material to a surface, such as, e.g., a roofing, building, or wall surface. As discussed above, the spray application system 100 includes (i) an airless spray device 110 that is configured to receive the fluid material and to spray the fluid material onto the surface, and (ii) a receptacle 150 that is attached to the airless spray device 110 and is configured to supply one or more components to the fluid material. According to an embodiment, the airless spray device 110 includes a handle 130 having a connector 140 that is configured to connect to a pressurized spray fluid source (see, e.g., pressurized spray fluid source 145 of FIG. 1) in order to supply the fluid material to the airless spray device 110. As discussed above, the receptacle 150 includes a container 152 configured to hold the one or more components (e.g., an additive and/or catalyst capable of triggering curing of the fluid material), as well as a funnel shaped member 155 that is attached to a body portion 115 of the airless spray device 110 via a coupling member 160, in order to supply the one or more components to the fluid material via the receptacle 150. According to an embodiment, the user can spray the fluid material and the one or more components onto the surface using the airless spray device 110 of the spray application system 100 by pulling the trigger 116 of the airless spray device 110. Once the trigger 116 of the airless spray device 110 is pulled, the fluid material is supplied via the pressurized spray fluid source (see, e.g., pressurized spray fluid source 145 of FIG. 1) through the handle 130 and into the body portion 115 of the airless spray device 110 and out of the spray outlet 120 of the airless spray device 110. In addition, as the fluid material is supplied via the pressurized spray fluid source (see, e.g., pressurized spray fluid source 145 of FIG. 1) through the handle 130 and into the body portion 115 of the airless spray device 110, the one or more components are supplied to the fluid material via the receptable 150.

According to one embodiment, the one or more components are supplied from the receptacle 150 to the fluid material contained within the body portion 115 of the airless spray device 110 prior to spraying the fluid material and the one or more components onto the surface.

In one embodiment, the supplying of the one or more components to the fluid material occurs while the fluid material is within the airless spray device 110.

In one embodiment, the supplying of the one or more components to the fluid material is conducted constantly as the fluid material is being supplied to the airless spray device 110. In another embodiment, the supplying of the one or more components to the fluid material is conducted intermittently as the fluid material is being supplied to the airless spray device 110.

In one embodiment, the receptacle 150 comprises a gravity and/or vacuum feed delivery system, such as, e.g., a gravity supply jar or container. According to this embodiment, the supplying of the one or more components to the fluid material via the receptacle 150 is conducted through gravity feed from the receptacle 150 to the airless spray device 110.

According to an embodiment, the one or more components are capable of triggering (or activating) curing of the fluid material. For example, according to an embodiment, the one or more components (e.g., an additive and/or water) are supplied at a trace level to the fluid material (e.g., a coating and/or adhesive) from the receptacle 150 attached to the airless spray device 110, when such a component(s) is needed for the curing process. In one embodiment, the one or more components comprise (i) water, (ii) an additive (such as, e.g., an amine), (iii) a catalyst (such as, e.g., organometallics-based catalysts, including, e.g., Dibutyltin or Dioctyltin), (iv) a solvent, or (v) a combination of (i), (ii), (iii) and/or (iv).

According to an embodiment, the fluid material (e.g., a coating and/or adhesive) is moisture-cured or catalyzed by the one or more components (e.g., an additive and/or water). In one embodiment, the fluid material comprises (i) an adhesive solution (such as, e.g., polyurethane, acrylic, STPE polymer, or Epoxy), (ii) a coating (such as, e.g., polyurethane, acrylic, STPE polymer, or Epoxy), or (iii) a combination of (i) or (ii). In an embodiment, the adhesive solution comprises a moisture-cured adhesive. In another embodiment, the coating comprises a moisture-cured coating.

In one embodiment, the one or more components decrease the time for the curing of the fluid material. For example, according to one embodiment, the one or more components decrease the time for curing the fluid material by 10%. According to one embodiment, the one or more components decrease the time for curing the fluid material by 20%. According to one embodiment, the one or more components decrease the time for curing the fluid material by 25%. According to one embodiment, the one or more components decrease the time for curing the fluid material by 30%. According to one embodiment, the one or more components decrease the time for curing the fluid material by 40%. According to one embodiment, the one or more components decrease the time for curing the fluid material by 50%. According to one embodiment, the one or more components decrease the time for curing the fluid material by 60%. According to one embodiment, the one or more components decrease the time for curing the fluid material by 70%. According to one embodiment, the one or more components decrease the time for curing the fluid material by 75%. According to one embodiment, the one or more components decrease the time for curing the fluid material by 80%. According to one embodiment, the one or more components decrease the time for curing the fluid material by 90%. According to one embodiment, the one or more components decrease the time for curing the fluid material by 100%. According to one embodiment, the one or more components decrease the time for curing the fluid material by 200%. According to one embodiment, the one or more components decrease the time for curing the fluid material by greater than 200%.

In one embodiment, the one or more components are supplied to the fluid material at a ratio of 0.1 to 10 parts component(s) to 90 to 99.9 parts fluid material.

In one embodiment, the one or more components are supplied to the fluid material at a ratio of 0.1 parts component(s) to 99.9 parts fluid material. In one embodiment, the one or more components are supplied to the fluid material at a ratio of 0.5 parts component(s) to 99.5 parts fluid material. In one embodiment, the one or more components are supplied to the fluid material at a ratio of 1 part component(s) to 99 parts fluid material. In one embodiment, the one or more components are supplied to the fluid material at a ratio of 5 parts component(s) to 95 parts fluid material. In one embodiment, the one or more components are supplied to the fluid material at a ratio of 10 parts component(s) to 90 parts fluid material. In one embodiment, the one or more components are supplied to the fluid material at a ratio of 15 parts component(s) to 85 parts fluid material. In one embodiment, the one or more components are supplied to the fluid material at a ratio of 20 parts component(s) to 80 parts fluid material. In one embodiment, the one or more components are supplied to the fluid material at a ratio of 25 parts component(s) to 75 parts fluid material. In one embodiment, the one or more components are supplied to the fluid material at a ratio of 30 parts component(s) to 70 parts fluid material. In one embodiment, the one or more components are supplied to the fluid material at a ratio of 40 parts component(s) to 60 parts fluid material. In one embodiment, the one or more components are supplied to the fluid material at a ratio of 50 parts component(s) to 50 parts fluid material.

In one embodiment, the one or more components are supplied to the fluid material at an amount of 0.01 percent to 20 percent by weight of the fluid material. In one embodiment, the one or more components are supplied to the fluid material at an amount of 0.01 percent to 10 percent by weight of the fluid material.

In one embodiment, the one or more components are supplied to the fluid material at an amount of less than 20 percent by weight of the fluid material. In one embodiment, the one or more components are supplied to the fluid material at an amount of less than 10 percent by weight of the fluid material. In one embodiment, the one or more components are supplied to the fluid material at an amount of less than 5 percent by weight of the fluid material. In one embodiment, the one or more components are supplied to the fluid material at an amount of less than 1 percent by weight of the fluid material. In one embodiment, the one or more components are supplied to the fluid material at an amount of less than 0.5 percent by weight of the fluid material. In one embodiment, the one or more components are supplied to the fluid material at an amount of less than 0.4 percent by weight of the fluid material. In one embodiment, the one or more components are supplied to the fluid material at an amount of less than 0.3 percent by weight of the fluid material. In one embodiment, the one or more components are supplied to the fluid material at an amount of less than 0.25 percent by weight of the fluid material. In one embodiment, the one or more components are supplied to the fluid material at an amount of less than 0.2 percent by weight of the fluid material. In one embodiment, the one or more components are supplied to the fluid material at an amount of less than 0.1 percent by weight of the fluid material.

In one embodiment, the surface is a roofing surface, a wall surface (e.g., an exterior or interior wall surface), a ceiling surface, a floor surface (including, e.g., the ground), a below grade surface, a building surface, a container surface, a vehicle surface, or a combination thereof.

In one embodiment, the surface is a roofing surface. According to an embodiment, the roofing surface includes, but is not limited to, shingles, roofing membranes, including, e.g., waterproofing membranes, underlayment, and tiles.

In one embodiment, the spraying of the fluid material and one or more components onto the surface is conducted in a low moisture environment. In another embodiment, the spraying of the fluid material and the one or more components onto the surface is conducted in a closed system with no access to moisture.

In one embodiment, the spray application system is hand-held and portable.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

The invention claimed is:

1. A method comprising:

obtaining a spray application system that is configured to apply a fluid material to a surface, the spray application system comprising:

(a) an airless spray device that is configured to receive the fluid material and to spray the fluid material onto the surface, the airless spray device having (i) a handle with a connector that is configured to connect to a pressurized spray fluid source that comprises the fluid material, and (ii) a spray outlet that is configured to spray the fluid material out of the airless spray device, wherein the fluid material comprises an adhesive, and (b) a receptacle that is attached to the airless spray device and is configured to supply one or more components to the fluid material, the receptacle being attached to the airless spray device via a coupling member that is positioned between the spray outlet and the handle of the airless spray device, wherein the one or more components is configured to cure the fluid material, and wherein the one or more components comprises (i) water, (ii) an additive, (iii) a catalyst, (iv) a solvent, or (v) a combination of (i), (ii), (iii), and/or (iv);

supplying the fluid material to the airless spray device;

supplying the one or more components to the fluid material via the receptacle and the coupling member, while the fluid material is within the airless spray device;

spraying the fluid material and the one or more components onto the surface using the airless spray device of the spray application system; and curing the fluid material with the one or more components on the surface, wherein the supplying of the one or more components to the fluid material occurs prior to the spraying of the fluid material and the one or more components onto the surface, and wherein the surface is a roofing surface, a wall surface, a ceiling surface, a floor surface, a below grade surface, a building surface, a container surface, a vehicle surface, or a combination thereof.

2. The method according to claim 1, wherein the supplying of the one or more components to the fluid material is conducted at least one of (i) constantly as the fluid material is being supplied to the airless spray device, or (ii) intermittently as the fluid material is being supplied to the airless spray device.

3. The method according to claim 1, wherein the supplying of the one or more components to the fluid material via the receptacle is conducted through gravity or vacuum feed from the receptacle to the airless spray device.

4. The method according to claim 1, wherein the one or more components decrease the time for the curing of the fluid material.

5. The method according to claim 1, wherein the one or more components are supplied to the fluid material at a ratio of 0.1 to 10 parts component(s) to 90 to 99.9 parts fluid material.

6. The method according to claim 1, wherein the one or more components are supplied to the fluid material at an amount of less than 0.5 percent by weight of the fluid material.

7. The method according to claim 1, wherein the spraying of the fluid material and the one or more components onto the surface is conducted in at least one of (i) an environment having a relative humidity level of from 10% to 50%, or (ii) a closed system with no access to moisture.

8. The method according to claim 1, wherein the handle of the airless spray device is attached to a tubing that is configured to supply the fluid material to the airless spray device.

9. The method according to claim 1, wherein the spray application system is hand-held and portable.

10. The method according to claim 1, wherein the receptacle is attached to the airless spray device via the coupling member at a region having a negative pressure produced by at least one of (i) a reduced diameter or (ii) a high speed liquid flow, which will generate a vacuum and suck the one or more components into the fluid material to thereby mix the one or more components with the fluid material when supplying the one or more components to the fluid material via the receptacle.

11. The method according to claim 1, wherein the one or more components comprises water.

12. The method according to claim 1, wherein the one or more components comprises an additive.

13. The method according to claim 1, wherein the one or more components comprises a catalyst.

14. The method according to claim 1, wherein the one or more components comprises a solvent.

15. The method according to claim 1, wherein the adhesive comprises a moisture-cured adhesive.

16. The method according to claim 1, wherein the one or more components are supplied to the fluid material at a ratio of 10 parts component(s) to 90 parts fluid material.

17. The method according to claim 1, wherein the one or more components are supplied to the fluid material at an amount of 0.01 percent to 10 percent by weight of the fluid material.

* * * * *